United States Patent Office 3,281,487
Patented Oct. 25, 1966

3,281,487
DRYING OILS AND PROCESS
Charles A. Rowe, Jr., Elizabeth, and Alan Schriesheim, Berkely Heights, N.J., and Donald L. Baeder, Baytown, Tex., assignors to Esso Research and Engineering Company, a corporation of Delaware
No Drawing. Filed May 21, 1964, Ser. No. 369,288
12 Claims. (Cl. 260—669)

This invention relates to improved polymers and copolymers of conjugated dienes such as 1,3-butadiene and to a method of preparing the same.

Valuable unsaturated polymers, preferably low molecular weight, normally liquid polymers of excellent quality can be made by polymerizing about 50 to 100 wt. percent of a conjugated diene of four to six carbon atoms such as 1,3-butadiene, hexadiene, isoprene, 2,3-dimethylbutadiene-1,3 piperylene, 2-methylpentadiene-1,3 and 4-methylpentadiene-1,3 and about 50 to 0 wt. percent of a vinyl aromatic hydrocarbon such as styrene, para methylstyrene and dimethylstyrene at −50 to 95° C., preferably at 45 to 85° C. in the presence of finely divided alkali metal or alkali metalorgano complexes such as butyl lithium, benzyl sodium, sodium anthracene or the like as the catalyst and of about .5 to 5 parts by weight of an inert hydrocarbon diluent boiling between about 0 to 250° C., or preferably between 30 and 200° C., such as pentane, benzene, cyclohexane, naphtha, mineral spirits or olefins per part by weight of monomeric reactant. Where low boiling materials are used, it is desirable to operate under sufficient pressure to maintain the charge in liquid phase, e.g., under pressures ranging from 1 to 5 atmospheres. Certain promoting agents, e.g., about 1 to 100 parts of dioxane, tetrahydrofuran or diethyl ether and catalyst activators, e.g., 1 to 20 wt. percent of isopropyl alcohol based upon the weight of alkali metal have also been added to the reaction mixture to assure the production of a colorless, normally liquid polymer and to shorten the reaction time.

The resulting polymers are predominantly, i.e. 70 to 90% or more of the 1,2-addition type (see "Polymers and Resins," page 500, by Brau Golding, D. Van Nostrand Co., Princeton, N.J., 1959) and thus contain 70% or more of their unsaturation in the form of pendant vinyl groups with the remaining unsaturation present as isolated cis and trans double bonds in the polymer backbone (1,4-addition). Butyl lithium catalyst in pure hydrocarbon media makes a polymer from butadiene with 80–90% of the structure coming from 1,4-addition. Addition of promoting agents and catalyst activators changes the mode of addition to 1,2. Many homopolymers and copolymers containing different amounts of various types of unsaturation are readily produced by varying the reactants, reaction conditions and catalyst. In all cases, normally liquid polymeric products are produced which consist of only carbon and hydrogen and contain a high degree of unsaturation. When spread on a surface, the polymer products have the property of undergoing a series of complicated cross-linking reactions in the presence of air (and a drying catalyst) which results in hard, transparent films. Accordingly, these polymers and copolymers are particularly useful as drying oils, protective coatings for a wide variety of materials, adhesives and as rubber compounding agents.

Of prime importance to the use of these products in any curing operation is the rate of cure. Slow curing products are uneconomical since higher temperatures and longer reaction times are required. It is, therefore, desirable to improve the rate of cure of these polymer products to the end that lower curing temperatures or shorter curing times can be used to convert these products to their hard, flexible, transparent film or solid form.

It is the object of this invention to prepare normally liquid polymers and copolymers of low molecular weight conjugated diolefins of improved curing rate characteristics.

It is also the object of this invention to provide a method for treating normally liquid polymers and copolymers of low molecular weight conjugated diolefins to impart faster cure properties thereto.

These and other objects will appear more clearly from the detailed specification and claims which follow.

It has now been found that the highly unsaturated, normally liquid polymers obtained by polymerizing about 50 to 100 weight percent of a conjugated $C_4$–$C_6$ diolefin and about 50 to 0 wt. percent of a vinyl aromatic hydrocarbon at temperatures of about −50 to 95° C. in the presence of finely divided alkali metal or alkali metalorgano complexes as the catalyst can be appreciably improved in rate of cure by treatment with a base (hydroxide or alkoxide) in a dipolar, aprotic solvent, preferably hexamethylphosphoramide. The treatment technique involves adding a solution of the polymer or copolymer to the base-dipolar aprotic solvent solution and heating at temperatures between 40 and 100° C. for a period of hours. The treatment alters the relative positions of the double bonds in the polymer molecule and in effect conjugates the unsaturated bonds. The extent of conjugation and double bond migration (isomerization) is determined by concentration of the base, temperature and time of isomerization. At the end of about 1 to 30 hours, depending upon the amount of conjugation needed, the solution is quenched with water or other aqueous media, extracted with a hydrocarbon, dried with conventional drying agents if the polymer is to remain in solution. If the polymer solution is to be stripped, drying by this means is not necessary since the stripping operation will distill out the water.

The polymers which are advantageously treated in accordance with the present invention are the normally liquid homopolymers of $C_4$ to $C_6$ conjugated diolefins such as 1,3-butadiene, hexadiene, isoprene, 2,3-dimethylbutadiene-1,3, piperylene, 2-methylpentadiene-1,3 and 4-methylpentadiene-1,3 and copolymers of the aforesaid conjugated diolefins with a minor proportion of a vinyl aromatic hydrocarbon such as styrene, alpha methylstyrene, para-methylstyrene, dimethylstyrene and the like. Preferred copolymers are those prepared from mixtures of about 75 to 85 wt. percent butadiene and 25 to 15 wt. percent of vinyl aromatic hydrocarbons.

Preparation of these homopolymers and copolymers is described in numerous patents such as Crouch U.S. Patent 2,631,175, Gleason et al., U.S. Patent 2,672,425, and Gleason, U.S. Patent 2,826,618. As may be seen from these patents, the polymer products obtained are normally liquid and when dissolved in an equal quantity of a hydrocarbon solvent such as mineral spirits, generally have a viscosity between about 0.1 and 20 poises or about 1,000 to 2,000 poises when diluent-free, corresponding to an intrinsic viscosity range of about 0.15 to 0.4. These polymer products, as noted above, contain more than about 70% of their unsaturation in the form of pendant vinyl groups due to the fact that polymerization is mainly of the 1,2-addition type.

The treatment of the aforementioned polymer products in accordance with the present invention to change the relative positions of the double bond and thus, in effect, conjugate the unsaturated bonds, is carried out by the use of particular base-solvent systems. The base employed is an alkoxide or hydroxide of alkali metals such as sodium and preferably the higher atomic weight elements potassium, cesium and rubidium. The alkoxides used are prepared from $C_2$ to $C_{10}$ alkanols preferably tertiary alkanols. The preferred base is potassium t-butylate.

The particular solvent employed with the foregoing bases to effect the improvement of the aforesaid polymer products is of critical importance. The solvents used may be defined as having the following characteristics: (1) aprotic, that is they must be very weak acid such as compounds in which all its hydrogens are bound to carbon, (2) high dielectric constant, E, in excess of 15 at 25° C., (3) dipolar, (4) nonhydroxylic and (5) the pKa is greater than 20. Of course, the solvents employed in the instant invention must be base stable, i.e. resistant to decomposition in the presence of the base and reactants. These solvents include organic compounds having the following dipolar groups: (1) a carbonyl, a divalent CO radical; (2) phosphoryl, a trivalent PO radical; (3) sulfinyl or sulfoxide, the divalent SO radical; (4) sulfone, the divalent $SO_2$ radical and (5) thiocarbonyl, the divalent CS radical. Solvents which meet these criteria are dipolar compounds such as alkyl sulfoxides such as dimethyl sulfoxide and diisopropyl sulfoxide; sulfones such as tetrahydro thiophene-1,1-dioxide; alkyl formamide such as N,N-dimethyl formamide, alkyl phosphoramides such as trimethyl phosphoramide and hexamethylphosphoramide and thioureas such as N,N'-dimethyl thiourea.

The particular ratios of solvent to base and base to polymer reactant are dependent on a variety of factors. For example, in homogeneous systems, it is desirable to have a solution which is from 0.5 molar to saturation of base in the solvent. Preferred concentration depends upon the particular base and polymer and is limited by convenience. This should be from 1 to 3 molar. For potassium tertiary butoxide this would be from 10 to 30 wt. percent while for sodium ethoxide this would be about 7 to 21 wt. percent. In heterogeneous base-solvent systems such as potassium hydroxide or sodium hydroxide systems, the base is practically insoluble. However, the amount of solvent present must be sufficient to ensure wetting the surface of the base. More solvent may be used if it is desirable to dissolve the polymer feed.

The ratio of the amount of base to the polymer should be about 0.02 to 0.5 moles per mole. Lower ratios are possible but are undesirable because of the slowness in the rate and by the disastrous effect of trace quantities of hydroxylic containing materials. Higher ratios are obviously uneconomical. The preferred range would be 0.05 to 0.2 moles of base per mole of polymer. The resin may be added together with an inactive hydrocarbon diluent such as cyclohexane, 0–50 wt. percent to decrease the viscosity and aid in the handling.

In carrying out the reaction disclosed herein, the temperature of the reaction mixture is maintained between about 40 and 100° C., preferably at about 55° C. The reaction is continued for a period of from about 1 to about 30 hours depending upon the degree of conjugation needed or desired in the polymer.

At the end of the reaction period or when the desired degree of conjugation has been attained, the reaction mixture is quenched by the addition of water equivalent to 1 to 3 times the volume of the solvent-base system. This mixture is then extracted 1–3 times with an organic solvent in a quantity sufficient to dissolve the polymer and to prevent troublesome emulsion formation. The volume usually runs from 2 to 4 times the volume of the resin. Drying may be accomplished by adding 2–5 wt. percent of an anhydrous drying agent such as potassium carbonate or magnesium sulfate for 1–4 hours with subsequent filtration by gravity, settling, or vacuum techniques or by simply vacuum stripping the solution.

The following examples are illustrative of the present invention.

EXAMPLE 1

A polybutadiene resin prepared by polymerizing butadiene in the presence of a hydrocarbon diluent and finely divided sodium as catalyst had a molecular weight of 2,300, a viscosity of 2.0 poises at 60% solids in Varsol and contained about 73% of its unsaturation in the form of pendant vinyl groups. Samples of this resin were tested for drying properties as thin (0.1 to 0.35 mil) can coatings and as thicker (0.7 to about 1.0 mil) pipe coatings.

Equal parts by weight of cyclohexane, dried and stored over 5 A. molecular sieves, and the above polybutadiene resin were mixed together and the resultant clear solution was stored in a dry box. In a typical run, equal volumes (250 cc. each) of a 0.5 M potassium tert. butoxide solution in hexamethylphosphoramide and the above resin-cyclohexane solution were thoroughly mixed together. The resultant solution which was blue in color and was allowed to sit in a thermostated bath maintained at 55° C. A number of these solutions were made and after various intervals, individual runs were quenched by the addition thereof to a large excess of cyclohexane followed immediately by water. The cyclohexane-polybutadiene phase was separated from the water-salt-hexamethylphosphoramide phase. Repeated extractions of the aqueous phase with cyclohexane gave essentially quantitative recoveries of the modified polybutadiene resin. Anhydrous magnesium sulfate was added to the cyclohexane extract and after a time the organic material was decanted or filtered into a Rinco evaporator and the cyclohexane stripped initially at room temperature. A hot water bath was used to strip the remaining solvent. Large batches were run for 1.5, 3, 6 and 23 hours. A standard was run for 0 and 23 hours with hexamethylphosphoramide but without added base. The several samples were subjected to ultraviolet analysis to determine the extent of conjugation and to infrared analysis to determine the microstructure of the several resins. In addition, the molecular weight of the resins was determined and their characteristics as a coating agent for metal surfaces were evaluated.

The physical properties of the untreated and treated or isomerized polybutadiene resin are summarized in Table I.

*Table I*

| Sample No. | 1 | 2 | 3 | 4 | 5 | 6 |
|---|---|---|---|---|---|---|
| Isom. Time, Hrs. | 0 | 1 | 1.5 | 3 | 6 | 23 |
| UV, Absorb., Rel.[1] (235–237 mu) | 1 | 13.0 | 17.7 | 22.0 | 40.9 | 79.0 |
| IR [2] percent (Normalized): | | | | | | |
| Type 1 | 72.7 | 64.8 | 58.4 | 65.9 | 57.1 | 44.2 |
| Type 2 Cis | 7.4 | 16.6 | 23.4 | 14.3 | 24.5 | 40.0 |
| Type 2 Trans | 19.9 | 18.6 | 18.2 | 19.8 | 18.4 | 15.8 |

[1] The ultraviolet adsorption of isolated double bonds in hydrocarbons is very nominal whereas the absorption for a system of conjugated double bonds is large. Comparison of the absorptivity of the treated polybutadiene at 235–237 mu were made relative to the untreated resin zero isomerization time. A steady increase in absorption with time of treatment is observed and at the end of 23 hours of treatment in the base-solvent system in accordance with this invention the absorptivity ratio was 79 indicating a substantial increase in conjugated double bonds by the treatment applied.

[2] Alkali metal catalyzed polybutadiene or other polyconjugated diolefins as well as copolymers of conjugated diolefins and vinyl aromatic compounds have a system of isolated double bonds or microstructure as follows:

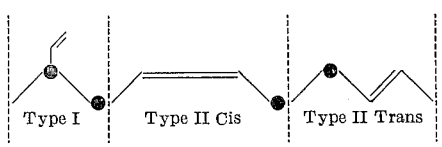

Type I    Type II Cis    Type II Trans

The pendant vinyl groups (Type I) and internal or Type II-cis and Type II-trans are readily characterized by I.R. spectroscopy. If conjugation occurs, it requires a change in microstructure. The values given shown the microstructure as determined by infrared spectroscopy as a function of time. It may be seen therefrom that Type I olefin decreases while the Type II-cis increases with time. Type IV olefin was not detectable apparently due to the inability of the I.R. analysis technique to distinguish between Type II and Type IV olefins. Because of this shortcomings of the I.R. analysis technique, no significance is placed upon the Type II-cis build-up. However, the fact that Type I olefin structure decreases with time of treatment with the base-solvent system in accordance with the present invention is clear evidence, together with the increased U.V. absorptivity that the unsaturation is moving from pendant vinyl groups into the backbone of the polymer molecule.

The curing rates of the several resins were determined at two thicknesses of film that was evenly deposited on metal templates as a 60% resin solution in heptane. These films represented the thickness usually used on can coatings (~0.3 mils) and pipe coatings (~1.0/mil). In both cases cures were effected with manganese naphthenate drier. The coated templates were then placed in circulating ovens at temperatures simulating actual can coating and pipe coating operations (395° F.) for varying lengths of time (8 min.–60 min.).

*Table II*

| Cat., Wt. Percent Based on Resin | [1] 0.05 | [1] 0.05 |
| Film Thickness | [2] 0.1–0.35 | [3] 0.7–1.0 |
| Cure, Min | 8 | 30 |
| Temp., °F | 395 | 395 |
| | Pencil Hardness [4] | |
| Isom., Hrs.: | | |
| 0 | 4H | 6B |
| 1.5 | 3H | 3H |
| 3 | 7H | 7H |
| 6 | 7H | 7H |
| 23 | 4H | 6H |

[1] Manganese naphthenate drier.
[2] Can coating.
[3] Pipe coating.
[4] W=wet, T=tacky, Pencil Hardness, 6B-7H, 6B=Softest, 7H=Hardest.

It may be seen that in thin film can coatings the untreated resin is cured to a 4H pencil hardness in 8 minutes at 395° C. with drier, while the base treated resins were harder. The 3 and 6 hour treated resins gave the maximum hardness in an 8 minute cure at 395° C. Untreated resin had to be cured for 30 min. to get a pencil hardness of 7H (Table III). In the case of the thick pipe-coating films, however, the untreated resin cured with manganese naphthenate dried only to 6B hardness, the softest on the pencil hardness scale while the treated resins, particularly when treated with the base-solvent system in accordance with the present invention for from 3 to 23 hours were cured to the maximum hardness under the same curing conditions. Tables IV, V and VI represent curing properties at different curing times. For example in Table III it took 30 minutes to get a 7H hardness from the untreated resin while it only took 8 minutes for a treated sample.

*Table III*

HARDNESS OF BAKED COATINGS 0.1 TO 0.35 MILS THICK, 0.05 WT. PERCENT MN. DRIER

| Cure Temp | 395° F. | | | | | |
|---|---|---|---|---|---|---|
| Cure Time | 8 min. | | 13 min. | | 30 min. | |
| Hardness Test | Sward | Pencil | Sward | Pencil | Sward | Pencil |
| Sample: | | | | | | |
| A | 22 | 4H | 26 | 5H | 34 | 7H |
| B | | 3H | | | | |
| C | | 7H | | | | |
| D | | 7H | | | | |
| E | | 4H | | | | |

EXAMPLE 2

A sample of polybutadiene copolymer resin prepared by polymerizing 20 wt. percent styrene and 80 wt. percent butadiene with sodium catalyst in a hydrocarbon diluent was treated as described in Example 1 except that the hydrocarbon solution of the resin was percolated through silica gel prior to use, and the untreated and treated resins were evaluated as coatings for metal surfaces and ultraviolet and infrared analyses as well as molecular weights of these materials were obtained. The original polymer had a molecular weight of 2,200, a viscosity of 2.1 poises at 60% solids content in Varsol, and 70% of its unsaturation in the form of pendant vinyl groups.

The physical properties of these untreated and treated or isomerized polybutadiene copolymer resins are summarized in Table IV.

*Table IV*

| Sample No | 1 | 2 | 3 | 4 | 5 | 6 | 7 |
|---|---|---|---|---|---|---|---|
| Isom. Time, Hrs | 0 | .5 | 1 | 2 | 4 | 18 | 48 |
| U.V. Absorb., Rel. 235–237 mu | 1 | 3.8 | 5.0 | 6.7 | 9.6 | 25.7 | 28.9 |

Table V shows the drying data for thin films air dried and thin films baked. The air dry coatings contained 0.2 wt. percent Cobalt naphthenates (based on resin solids) and the baked thin films contained 0.05 wt. percent manganese naphthenate (based on resin solids). In one case thin films were baked without driers. All resins were spread on metal templates as 50% solutions in Varsol.

*Table V*

| Cat., Wt. percent | 0.2 (Co) | 0.05 (Mn) | 0 |
|---|---|---|---|
| Film Thickness | 0.5 | 0.3 | 0.25 |
| Cure, Min | 6 days | 4-8 | 8 |
| Temp., °F | R.T. | 395 | 395 |
| | | Pencil Hardness | |
| Isom., Hrs.: | | | |
| 0 | Tacky | 3H-4H | 7H | 6H |
| .5 | ----do---- | 3H-4H | 7H | 7H |
| 1 | Slightly tacky | 2H-3H | 7H | |
| 2 | Very slightly tacky | | 7H | |
| 4 | B-HB | 5H-6H | 7H | 6H |
| 18 | 2B-B | 3H-4H | 7H | |
| 48 | 2B-B | 3H-4H | 7H | 6H |

For the air dried coatings there is a decided acceleration of curing for the base treated samples. The extent of tackiness at the end of 6 days was progressively less for samples which had been base treated. The 4, 18, and 48 hr. samples cured to 2B-HB hardness while the untreated sample was tacky.

Thin films which were baked with and without catalyst were indistinguishable when cured for 8 minutes. Less time for cures (4 minutes) did not show any distinction between treated and untreated films.

Table VI shows the polymer from Example 2 cured in thick films at temperatures of 325° F. and 350° F. for 30 minutes. Under each set of conditions the treated samples give harder films. For films around 0.8 mils the untreated resin had a hardness of F-H after curing at 325° F. In this case, the 0.5 and 4 hour sample showed no chanage while the 18 and 48 hour sample cured to a 2H-3H and H-2H hardness. When the films were baked at 350° F. the treated film was decidedly harder than the untreated films. There was no difference in the hardness of the untreated film at the two temperatures. However, in the treated cases a large temperature effect was observed since these samples were much harder at the higher temperatures. With thicker films (1.0 mil) a large difference in hardness is also observed when comparing the treated and untreated resins.

*Table VI*

| Cat., Wt. percent | | 0.05(Mn) | | |
|---|---|---|---|---|
| Film Thickness | .8 | 1.0 | .8 | |
| Cure Min | 30 | | | |
| Temp., °F | 325 | | 350 | |
| | | Pencil Hardness | | |
| Isom., Hrs.: | | | | |
| 0 | | F-H | 5B | F-H. |
| .5 | | F-H | HB-F | H-2H. |
| 1 | | | HB-F | 2H-3H. |
| 2 | | | | 2H-3H. |
| 4 | | F-H | 2B-B | |
| 18 | | 2H-3H | F-H | 5H-6H. |
| 48 | | H-2H | 2B-B | 3H-4H. |

The foregoing description contains a limited number of embodiments of the present invention. It will be understood that this invention is not limited to these specific embodiments since numerous variations are possible without departing from the scope of this invention as defined in the following claims.

What is claimed is:

1. A method of treating highly unsaturated normally liquid polymers obtained by polymerizing about 50 to 100 wt. percent of a conjugated $C_4$–$C_6$ diolefin and about 50 to 0 wt. percent of a vinyl aromatic hydrocarbon at temperatures of about −50 to 95° C. in the presence of a catalyst selected from the group consisting of finely divided alkali metal and alkaline metalorgano complexes, which polymers have a major proportion of their unsaturation in pendant vinyl groups, which comprises maintaining said polymers in contact with a base-dipolar aprotic solvent solution at a temperature between about 40 and 100° C. for from about 1 to 30 hours, quenching the reaction mixture with an aqueous medium and recovering the treated polymer product.

2. The method as defined in claim 1 in which the base is an alkali metal alkoxid prepared from a $C_2$ to $C_{10}$ alkanol.

3. The method as defined in claim 1 in which the base is an alkali metal alkoxide prepared from a $C_2$ to $C_{10}$ alkanol and the solvent is an alky phosphoramide.

4. The method as defined in claim 1 in which the base-solvent system is a 0.5 molar to saturation solution of potassium tertiary butoxide in hexamethylphosphoramide.

5. A method of treating highly unsaturated normally liquid polymers obtained by polymerizing about 50 to 100 wt. percent of a conjugated $C_4$–$C_6$ diolefin and about 50 to 0 wt. percent of a vinyl aromatic compound at temperatures of about 25 to 95° C. in the presence of finely divided metallic sodium catalyst, which polymers have a major proportion of their unsaturation in pendent vinyl groups, which comprises maintaining said polymers in contact with a base-dipolar aprotic solvent solution at a temperature between about 40 and 100° C. for from about 1 to 30 hours, quenching the reaction mixture with an aqueous medium and recovering the treated polymer product.

6. The method is defined in claim 5 in which the base is an alkali metal alkoxide prepared from a $C_2$ to $C_{10}$ alkanol.

7. The method as defined in claim 5 in which the base is an alkali metal alkoxide prepared from a $C_2$ to $C_{10}$ alkonol and the solvent is an alkyl phosphoramide.

8. The method as defined in claim 5 in which the base-solvent system is a 0.5 molar to saturation solution of potassium tertiary butoxide in hexamethylphosphoramide.

9. A method of treating highly unsaturated normally liquid polymers obtained by polymerizing about 50 to 100 wt. percent butadiene-1,3 and about 50 to 0 wt. percent of styrene at temperatures of about 25 to 95° C. in the presence of finely divided metallic sodium catalyst, which polymers have a major proportion of their unsaturation in pendent vinyl groups, which comprises maintaining said polymers in contact with a base-dipolar aprotic solvent solution at a temperature between about 40 and 100° C. for from about 1 to 30 hours, quenching the reaction mixture with an aqueous medium and recovering the treated polymer product.

10. The method as defined in claim 9 in which the base is an alkali metal alkoxide prepared from a $C_2$ to $C_{10}$ alkanol.

11. The method as defined in claim 9 in which the base is an alkali metal alkoxide prepared from a $C_2$ to $C_{10}$ alkanol and the solvent is an alkyl phosphoramide.

12. The method as defined in claim 9 in which the base-solvent system is a 0.5 molar to saturation solution of potassium tertiary butoxide in hexamethylphosphoramide.

References Cited by the Examiner

UNITED STATES PATENTS 3,213,155 10/1965 Schriensheim et al. __ 260–680X
3,217,050 11/1965 Schreisheim et al. __ 260—680X DELBERT E. GANTZ, *Primary Examiner.*

C. R. DAVIS, *Assistant Examiner.*